United States Patent
Ogawa et al.

[11] Patent Number: 6,085,795
[45] Date of Patent: Jul. 11, 2000

[54] CORRUGATE TUBE FIXING PROTECTOR

[75] Inventors: Tatsuo Ogawa; Gen Ozono, both of Shizuoka-ken, Japan

[73] Assignee: Yazaki Corporation, Tokyo, Japan

[21] Appl. No.: 09/195,240

[22] Filed: Nov. 18, 1998

[30] Foreign Application Priority Data

Nov. 19, 1997 [JP] Japan ............................ 9-318566

[51] Int. Cl.⁷ ............................................ F16L 55/00
[52] U.S. Cl. ........................... 138/108; 138/110; 138/112
[58] Field of Search ........................... 138/108, 106, 138/110, 112

[56] References Cited

U.S. PATENT DOCUMENTS

| | | | |
|---|---|---|---|
| 3,648,734 | 3/1972 | Waite et al. | 138/114 |
| 4,178,001 | 12/1979 | Stanley et al. | 138/155 |
| 4,285,396 | 8/1981 | Schwoerer et al. | 138/114 |
| 5,465,759 | 11/1995 | Carlson et al. | 138/110 |

FOREIGN PATENT DOCUMENTS

| | | |
|---|---|---|
| 5-88131 | 11/1993 | Japan . |
| 6-84726 | 12/1994 | Japan . |
| 7-7829 | 1/1995 | Japan . |

*Primary Examiner*—James Hook
*Attorney, Agent, or Firm*—Finnegan, Henderson, Farabow, Garrett & Dunner, L.L.P.

[57] ABSTRACT

A corrugate tube with an inserted wiring harness is provided through an insertion hole of a protector body fitted in a fixing hole of a panel member, and fixed by a pawl provided at an end of a flexible arm projecting from a bottom of an arm accommodating cutout and shaped to be engageable with a trough between neighboring corrugates on the corrugate tube, permitting a selective one of small-diameter and large-diameter corrugate tubes to be fixed in the insertion hole, allowing the corrugate tube to be shifted in one direction.

6 Claims, 4 Drawing Sheets

CORRUGATE TUBE FIXING PROTECTOR

BACKGROUND OF THE INVENTION

1. Field of the Invention

The present invention relates to a corrugate tube fixing protector. More specifically, the invention relates to a corrugate tube fixing protector to be fitted in a fixing hole of a panel member, such as in a vehicle, for fixing an inserted corrugate tube having an EDS (electrical distribution system) element fitted therein, such as a so-called wiring harness, and for protecting the EDS element from an undesirable contact with an edge of the hole.

2. Description of Relevant Art

FIG. 1 shows a conventional corrugate tube fixing protector disclosed in Japanese Utility Model Application Laid-Open Publication No. 5-88131 (1993). The protector 1 is a synthetic resin made, and is adapted for fixing a corrugate tube 9 into which a wiring harness W is fitted, and comprises a protector body 2 in a U-form in cross section. The protector body 2 has a groove 3 formed near a front end thereof along a U-form inner surface thereof, i.e. along insides of its both side walls 2a and bottom wall 2b. And, a pair of upper and lower separate stoppers 4, 4' are fitted in the groove 3. The upper and lower stoppers 4, 4' are formed with upper and lower semi-circular recesses 2a, which cooperatively define a hole with a corresponding diameter to a bottom 9a of a flank of each corrugate on the corrugate tube 9. The upper stopper 4 has near top corners thereof a pair of forward projections 4c engaged to be locked in a pair of engagement holes 2c, which are formed through front parts of both side walls 2a of the protector body 2 and communicate with the groove 3.

The lower stopper 4' is fitted in the groove 3 at inner sides of both side walls 2a of the protector body 2. As shown in FIG. 2, the respective semi-circular recesses 4a of the upper and lower stoppers 4, 4' cooperate with each other to hold therebetween the flank bottom 9a of corrugate on the corrugate tube 9, so that this tube 9 is fixed within a region defined by the side walls 2a and the bottom wall 2b of the protector body 2, before a tape T is wound on the protector body 2.

There are disclosed similar techniques for such a corrugate tube fixing protector in Japanese Utility Model Application Laid-Open Publication No. 62-145426 (1987), Japanese Patent Application Laid-Open Publication No. 61-218318 (1986), and Japanese Patent Application Laid-Open Publication No. 7-7829 (1995).

Such conventional corrugate tube fixing protectors are each provided with a pair of stoppers 4, 4' for fixing a corrugate tube 9 with a specified diameter, thus needing another pair of stoppers for fixing a corrugate tube with a different diameter. Moreover, once fixed between the pair of stoppers 4, 4', the corrugate tube 9 is kept from having its fixing position changed unless forward projections 4c of an upper stopper 4 are disengaged from engagement holes 2c of a protector body 2.

SUMMARY OF THE INVENTION

The present invention has been achieved with such points in view.

It therefore is an object of the invention to provide a corrugate tube fixing protector, allowing for a single protector body to effect a facilitated secure fixing of an inserted corrugate tube that may have a variety of outside diameters, permitting an easy relocation of the fixing position.

A first aspect of the invention provides a corrugate tube fixing protector for fixing a corrugate tube inserted in a fixing hole of a panel member, protecting an EDS element fitted in the corrugate tube, the corrugate tube fixing protector comprising a protector body to be fitted in the fixing hole, the protector body having an insertion hole provided therethrough for the corrugate tube to be inserted therein, and a combination of a flexible arm projecting from a wall of the insertion hole and a pawl provided at an end of the flexible arm, the combination of the flexible arm and the pawl accommodating the corrugate tube to be variable in outside diameter, allowing the corrugate tube to be moved in a single direction.

According to the first aspect of the invention, a corrugate tube that may have a variety of outside diameters can be fitted securely and easily in an insertion hole provided through a protector body, by a locking engagement with a pawl of a flexible arm. Even after the fixing to the insertion hole of the protector body by the pawl of the flexible arm, the corrugate tube is movable with ease in one direction, to have a relocated fixing position.

According to a second aspect of the invention, the corrugate tube fixing protector further comprises an accommodation recess formed in the wall of the insertion hole, for accommodating therein the flexible arm.

According to the second aspect, when a large-diameter corrugate tube is fitted in the insertion hole of the protector body for a locking engagement with the pawl of the flexible arm, the flexible arm is allowed to flex into an accommodation recess, without bearing undue pressures due to a forced insertion of the large-diameter corrugate tube. Therefore, the flexible arm can hold the corrugate tube with an adequate holding force, whether its outside diameter is large or small.

According to a third aspect of the invention, the protector body comprises a pair of split bodies each having a split part of the insertion hole and the flexible arm, a hinge element interconnecting the split bodies, and a combination of engagement and locking elements provided either on both the split bodies.

According to the third aspect, a corrugate tube with an inserted EDS element can be placed in position with ease by opening either split body of a protector body relative to the other split body, before closing the opened split body to fix the corrugate tube with pawls of flexible arms. After the close, the split bodies can be locked to each other by a combination of engagement and locking elements.

BRIEF DESCRIPTION OF THE ACCOMPANING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
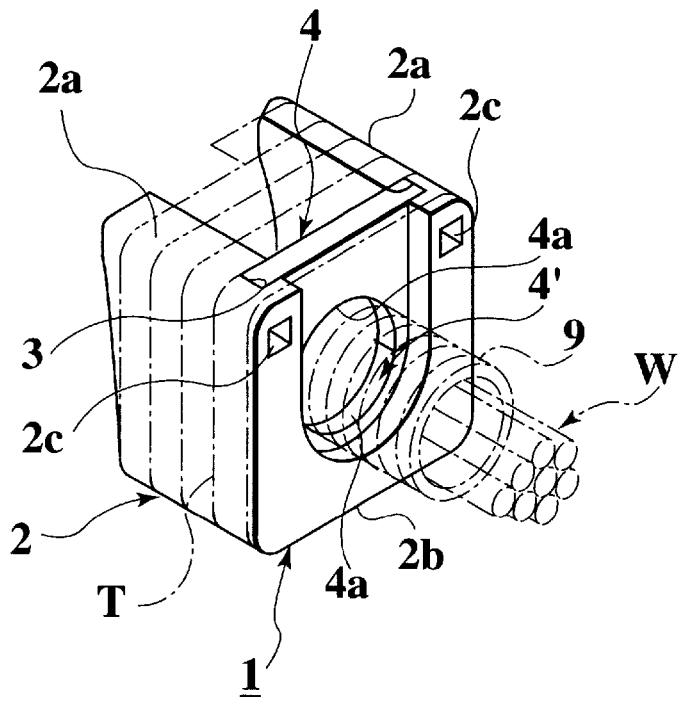
FIG. 1 is a perspective view of a conventional corrugate tube fixing protector.
Figure 2:
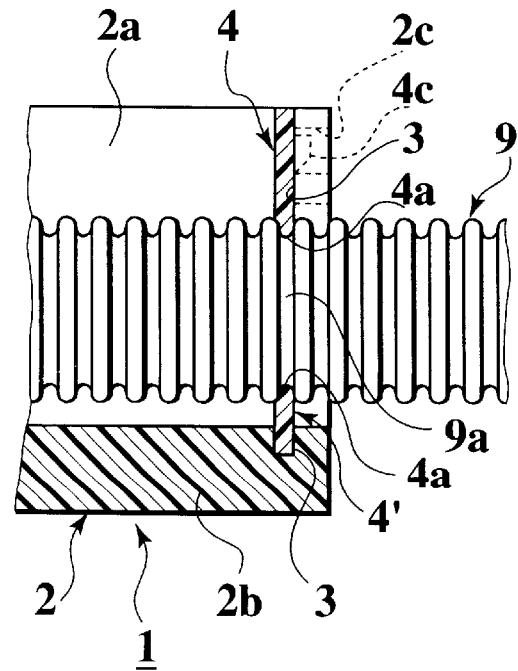
FIG. 2 is a longitudinal section of the protector of FIG. 1, with a corrugate tube fitted therein.

There will be detailed below the preferred embodiments of the present invention with reference to the accompanying drawings. Like members are designated by like reference characters.

Figure 3:
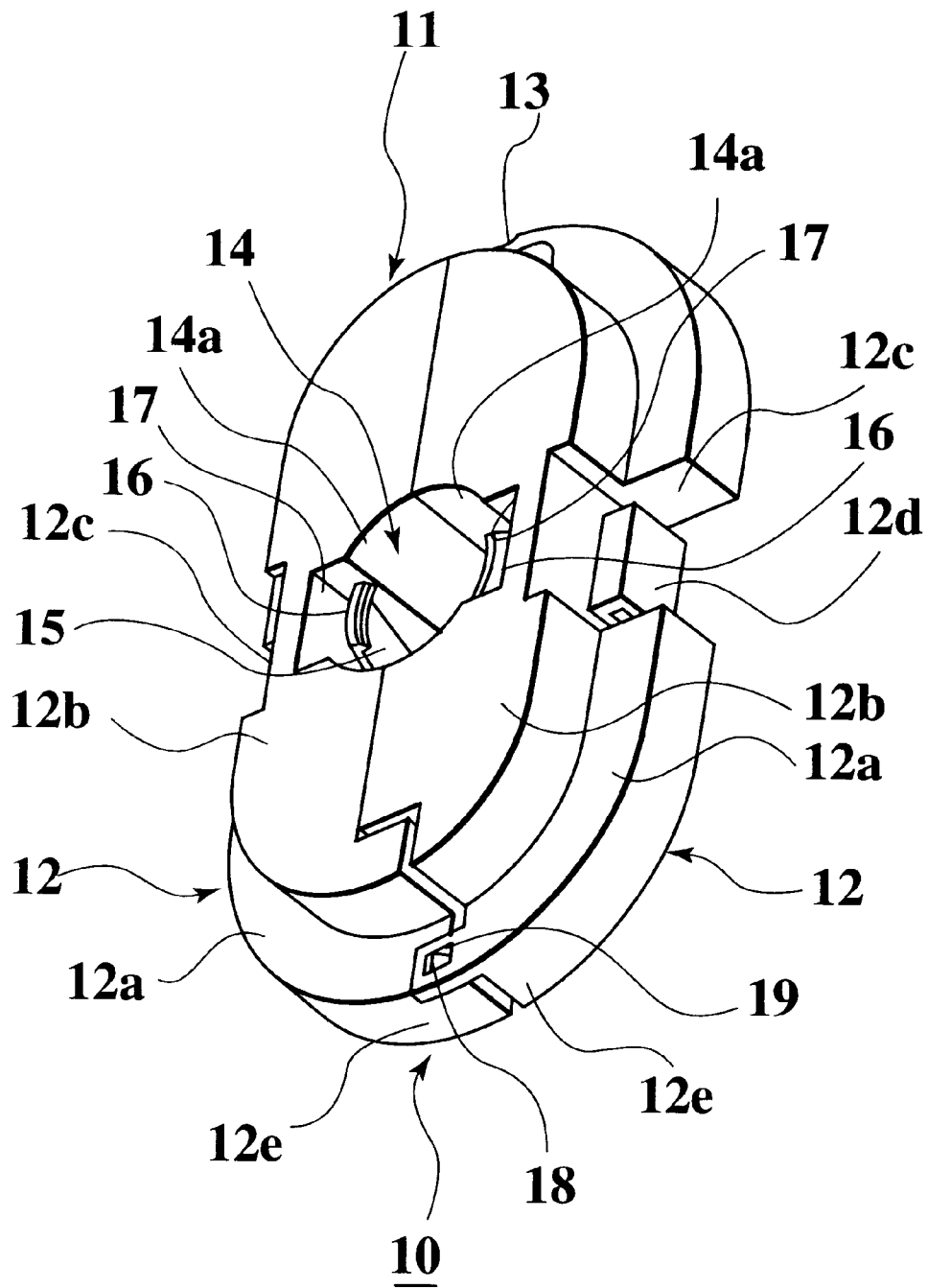
FIG. 3 is a perspective view of a corrugate tube fixing protector according to an embodiment of the invention.
Figure 4:
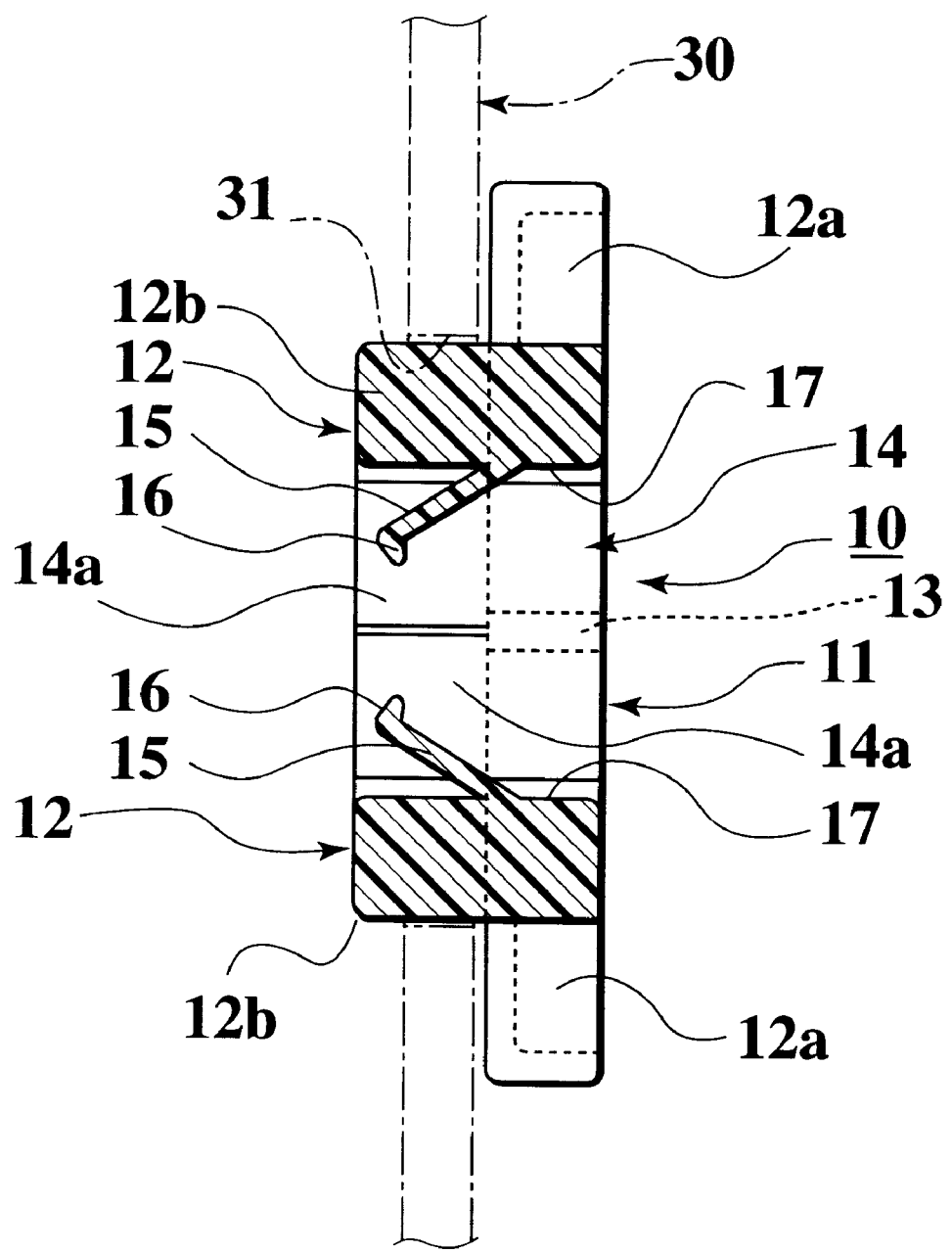
FIG. 4 is a longitudinal section of the protector of FIG. 3.
Figure 5A:
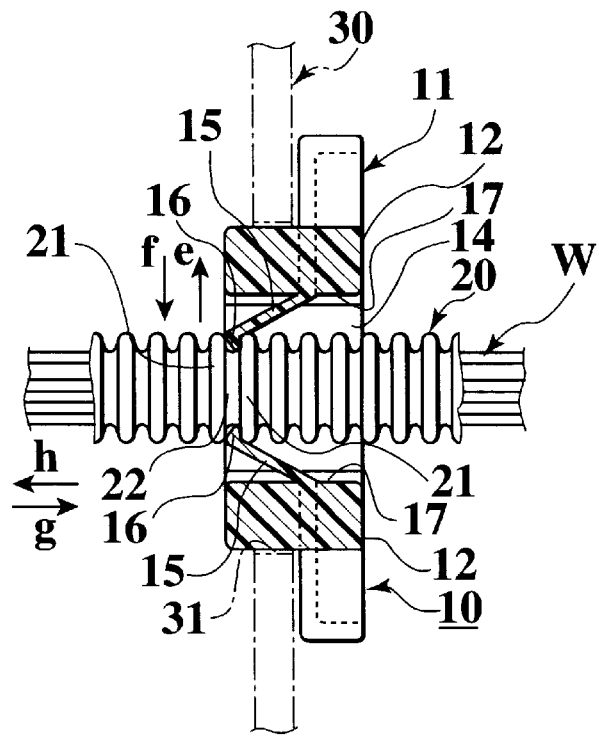
FIG. 5A is a section of the protector of FIG. 3, with a small-diameter corrugate tube fitted therein.
Figure 5B:
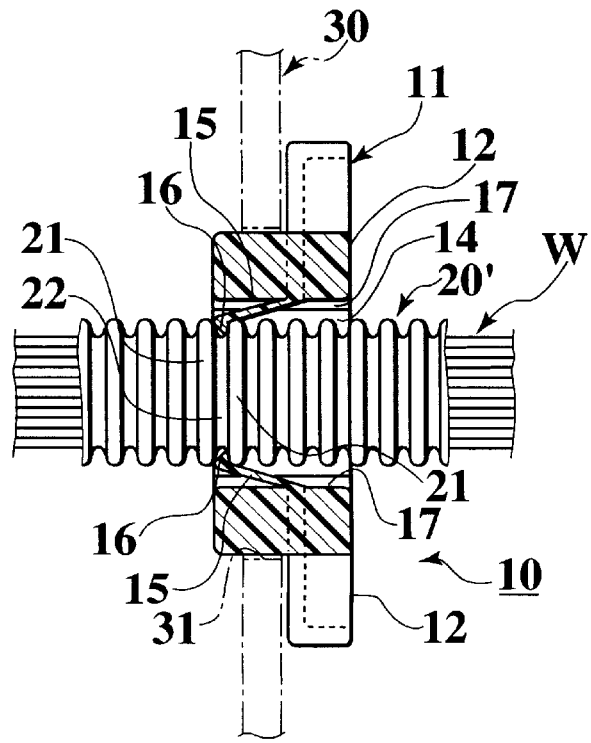
FIG. 5B is a section of the protector of FIG. 3, with a large-diameter corrugate tube fitted therein.

FIGS. 3, 4 show a corrugate tube fixing protector 10 according to an embodiment of the invention, FIG. 5A, the protector 10 with a small-diameter corrugate tube 20 fixed therein, and FIG. 5B, the protector 10 with a large-diameter corrugate tube 20' fixed therein.

The corrugate tube fixing protector 10 has a protector body 11 of a synthetic resin made to be fitted in an elliptic fixing hole 31, which is formed through a panel member 30 of a vehicle. The protector body 11 comprises a pair of left and right half split bodies 12 hinged either on the other by a peripheral hinge 13. The left and right split bodies 12 are each comprised of an axially extending relatively narrow central thick wall portion 12b as a main body shaped in a substantially semi-elliptic configuration, and a relatively wide circumferential thin wall portion 12a as a stopping flange shaped in a substantially semi-elliptic configuration. The respective thick wall portions 12b of the left and right split bodies 12 have their mating faces formed with central semicircular channel-like recesses 14a, which are cooperative with each other to define a common insertion hole 14 for the small-diameter corrugate tube 20 (FIG. 5A) and a large-diameter corrugate tube 20' (FIG. 5B) to be selectively provided therethrough together with a wiring harness or EDS element W fitted therein.

As shown in FIG. 3, each semi-circular recess 14a has an axially extending channel or cutout 17 formed in a central part thereof and shaped rectangular in section, and a flexible tongue or arm 15 obliquely projecting from a bottom of the channel 17. In other words, substantially rectangular-plate-shaped flexible arms 15 are projected respectively from the centers of the semicircular recesses 14a of the split bodies 12. Each arm 15 has (relative to the recess 14) a radially outwardly arcuate lip or pawl 16 integrally formed on a radially inner side of a free end thereof, for a common locking engagement with a corresponding circumferential part (of tube 20, 20') at a bottom of trough 22 between a pair of neighboring corrugates 21 on a selective one of the small-diameter corrugate tube 20 and the large-diameter corrugate tube 20'. As shown in FIGS. 4, 5A and 5B, each oblique flexible arm 15 normally resides within an axial range between from a vicinity of an upside of the wide thin wall portion 12a to an upside of the narrow thick wall portion 12b, and flexes to open in the direction of an arrow "e" (FIG. 5A), when the pawl 16 overrides any corrugate 21, and to close in the direction of an arrow "f" (FIG. 5A), when the pawl 16 engages with a subsequent trough 22, as the corrugate tube 20/20' is inserted and shifted. Such flexible deformations of the flexible arms 15 allow for the corrugate tubes 20, 20' with different outside diameters to be selectively provided through the insertion hole 14 of the protector body 11, and for the inserted corrugate tube 20/20' to be further shifted in one direction, i.e., the direction of an arrow "h" in FIG. 5A.

The cutout 17 at the central region of each semicircular recess 14a serves as an accommodation recess for the flexible arm 15 to partially or wholly escape therein and rest on its bottom, when deformed to open. Each split body 12 has on its outside an axially extending rectangular cutout 12c formed therein in opposition to the cutout 17, over depths of the thin wall portion 12a and the thick wall portion 12b. On a bottom of the cutout 12c is formed a locking integral pawl 12d to be engaged with an engagement part of the fixing hole 31 of the panel member 30. The tendency for the split bodies 12 to open about the hinge 13 is blocked by providing a locking mechanism to their free ends 12e, which mechanism comprises a triangular-prism-shaped projection 18 formed as a locking element on either end 12e and a square hole 19 formed as an engaging element in the other end 12e.

In the corrugate tube fixing protector 10 according to the embodiment, the flexible arms 15 as integral projections from the semicircular recesses 14a of the split bodies 12 deform in the direction "e" (FIG. 5A), so that a selective one of the small-diameter corrugate tube 20 of FIG. 5A and the large-diameter corrugate tube 20' of FIG. 5B fits in the insertion hole 14 of the protector body 11 with ease and in a secured manner by the pawls 16 on the flexible arms 15. As each flexible arm 15 is flexible in the direction "h" in FIG. 5A, after the corrugate tube 20 (20') is fixed in the insertion hole 14 of the protector body 11 with the pawls 16 of the flexible arms 15, the corrugate tube 20 (20') can be moved in one direction, i.e., in the direction "h", so its fixing position can be relocated easily.

One may try to draw the fixed corrugate tube 20 (20') in the direction of an arrow "g" (FIG. 5A) to have a changed fixing position. Each flexible arm 15 then has a tendency to deform in the direction "f". However, such a tendency is resisted by an underlying body of the corrugate tube 20(20'), and the flexible arm 15 is blocked against deformation. As a result, the trial to draw the corrugate tube 20(20') in the direction "g" will fail.

After the protector 10 is fitted in the fixing hole 31 of the panel 30 of the vehicle and the corrugate tube 20 (20') is fixed in the protector 10 in the aforementioned manner, the corrugate tube 20 (20') is pulled to the direction "h" so that its margin of mounting length can be eliminated. As a result, the mounting workability is good, and the corrugate tube 20 (20') does not return to the direction "g" opposite to the direction "h". Therefore, the corrugate tube 20 (20') does not sag.

In addition, the protector body 11 is composed of a pair of split bodies 12 interconnected by the hinge 13, and the flexible arms 15 are projected respectively from the semi-circular recesses 14a that constitute the insertion hole 14 when the split bodies 12 are assembled together. The split bodies 12 have, at their free ends 12e, a combination of a locking projection 18 and an engagement hole 19 engageable with and disengageable from the projection 18. Either split body 12 may be opened relative to the other 12 so that the corrugate tube 20 (20') with the wiring harness W inserted therein can be placed in position with ease, before simply returning the opened split body 12 to a closed state, where the corrugate tube 20 (20') is securely fixed in the insertion hole 14 of the protector body 11 with the pawls 16 of the flexible arms 15 engaging therewith, and the split bodies 12 are locked to each other with the locking projection 18 engaging with the engagement hole 19.

Further, a pair of cutouts 17 for accommodating the flexible arms 15 are formed at diametrically opposite locations of the insertion hole 14 of the protector body 11, and the flexible arms 15 are likewise arranged. In the case the large-diameter corrugate tube 20' is fixed in the insertion hole 14 of the protector body 11 with the pawls 16 of the flexible arms 15, each flexible arm 15 is flexed toward a bottom of the cutout 17, without being extremely pressed by the large-diameter corrugate tube 20'. As a result, the elastic force of the flexible arms 15 is always maintained, and even the large-diameter corrugate tube 20' can be easily and securely fixed in the insertion hole 14 of the protector body 11 with the pawls 16 of the flexible arms 15.

According to the aforementioned embodiment, a pair of the flexible arms are projected from the insertion hole of the protector body, but three or more flexible arms can be projected.

As mentioned above, according to the invention, the flexible arm, which allows the small-diameter or large-diameter corrugate tube to be fixed in the insertion hole of the protector body and allows the corrugate tube to be moved in a single direction, is projected, and the pawl is provided at the end of the flexible arm. As a result, a corrugate tube, that may have a variety of outside diameters, can be easily and securely fixed in the insertion hole of the protector body with the pawls of the flexible arms, and after the corrugate tube is fixed in the insertion hole of the protector body with the pawls of the flexible arms, the corrugate tube can be moved in a single direction so that its fixing position can be relocated easily.

Further, since the accommodation cutout for accommodating the flexible arm is provided in position of the insertion hole of the protector body which face the flexible arm, in the case a large-diameter corrugate tube is fixed in the insertion hole of the protector body with the pawl of the flexible arm, the flexible arm is flexed to the side of the accommodation cutout so as not to be excessively pressed by the large-diameter corrugate tube. As a result, the elastic force of the flexible arms is always maintained, so even the large-diameter corrugate tube can be easily and securely fixed in the insertion hole of the protector body with the pawl of the flexible arm.

Further, the protector body is composed of a pair of split bodies interconnected by the hinge section, and the flexible arms are provided in the insertion hole defined by the split bodies, and the locking and engagement elements that can be engaged with and removed from each other, are provided respectively at the free ends of the split bodies. As a result, the corrugate tube, into which the wiring harness is inserted, can be mounted easily by opening the split bodies, and the corrugate tube can be easily and securely fixed in the insertion hole of the protector body with the pawls of the flexible arms by closing the split bodies.

While preferred embodiments of the present invention have been described using specific terms, such description is for illustrative purpose, and it is to be understood that changes and variations may be made without departing from the spirit or scope of the following claims.

What is claimed is:

1. A corrugate tube fixing protector for fixing a corrugate tube inserted in a fixing hole of a panel member, protecting an electrical distribution system element fitted in the corrugate tube, the corrugate tube fixing protector comprising:

a protector body to be fitted in the fixing hole, the protector body having an insertion hole provided therethrough for the corrugate tube to be inserted therein; and a combination of a flexible arm projecting from and integral with a wall of the insertion hole of the protector body and a pawl provided at an end of the flexible arm, the combination of the pawl and the flexible arm accommodating the corrugate tube to be variable in outside diameter, allowing the corrugate tube to be moved in a single direction.

2. The corrugate tube fixing protector as claimed in claim 1, further comprising an accommodation recess formed in the wall of the insertion hole of the protector body for accommodating therein the flexible arm.

3. The corrugate tube fixing protector as claimed in claim 1, wherein the protector body comprises:

a pair of split bodies each having a split segment of the insertion hole and the flexible arm, the protector body being split in the radial direction along a line passing through the center of the insertion hole;

a hinge element interconnecting the split bodies; and a combination of the engagement and locking elements provided either on both the split bodies.

4. The corrugate tube fixing protector as claimed in claim 3, wherein the split bodies may be pivoted about the hinge element to open the protector body along the radial split, thereby moving the respective flexible arms and pawls away from one another to an open position so that the corrugate tube may be inserted in the insertion hole without interference with the flexible arms and pawls.

5. The corrugate tube fixing protector as claimed in claim 1, wherein the flexible arm is axially fixed relative to the protector body.

6. A corrugate tube fixing protector for fixing a corrugate tube inserted in a fixing hole of a panel member, protecting an electrical distribution system element fitted in the corrugate tube, the corrugate tube fixing protector comprising:

a protector body to be fitted in the fixing hole, the protector body having an insertion hole provided therethrough for the corrugate tube to be inserted therein, the protector body comprising a pair of radially split bodies each having a split segment defining a portion of the insertion hole, at least one of the radially split bodies being pivotable about an axis of a hinge element of the other radially split body to an open position so that the corrugate tube can be inserted into the insertion hole without interference prior to insertion of the protector body into the fixing hole of the panel member, the axis of the hinge element being parallel to an axis of the insertion hole;

a flexible arm projecting from and integral with each of the radial split bodies, the flexible arm projecting into the insertion hole; and a pawl provided at an end of each flexible arm, wherein the combination of the pawl and the flexible arm accommodates the corrugate tube to be variable in outside diameter, allowing the corrugate tube to be moved in a single direction.

* * * * *